United States Patent
Xu et al.

(10) Patent No.: US 12,354,578 B2
(45) Date of Patent: Jul. 8, 2025

(54) METHOD AND APPARATUS FOR EDITING AUDIO SPECIAL EFFECT, DEVICE AND STORAGE MEDIUM

(71) Applicant: Beijing Zitiao Network Technology Co., Ltd., Beijing (CN)

(72) Inventors: Yuan Xu, Beijing (CN); Ruifeng Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 193 days.

(21) Appl. No.: 18/071,404

(22) Filed: Nov. 29, 2022

(65) Prior Publication Data

US 2023/0222997 A1  Jul. 13, 2023

(30) Foreign Application Priority Data

Jan. 10, 2022 (CN) .......................... 202210020391.8

(51) Int. Cl.
*G10H 1/36* (2006.01)
*G06F 3/16* (2006.01)
*H04N 5/262* (2006.01)

(52) U.S. Cl.
CPC .............. *G10H 1/366* (2013.01); *G06F 3/165* (2013.01); *H04N 5/2621* (2013.01)

(58) Field of Classification Search
CPC ........... G06F 3/165; G06F 3/16; G06F 3/0484
(Continued)

(56) References Cited

U.S. PATENT DOCUMENTS 7,915,514 B1 *  3/2011  Shrem .................. G10H 1/0075
  84/645
8,085,269 B1 * 12/2011  Classen ................. G11B 27/34
  381/119

(Continued)

FOREIGN PATENT DOCUMENTS

CN 107967706 A 4/2018
CN 110289024 A 9/2019

(Continued)

OTHER PUBLICATIONS

International Search Report in PCT/CN2023/070885, mailed Apr. 28, 2023, 4 pages.

(Continued)

*Primary Examiner* — Alexander Krzystan
(74) *Attorney, Agent, or Firm* — Astute IP Law Group

(57) ABSTRACT

A method for editing an audio special effect includes that an audio input control, an audio playing control and an audio output control and at least one of an audio special effect control or an audio detection control are created based on a first creation operation triggered by a user; an audio output port of the audio input control is connected to an audio input port of the audio playing control, an audio output port of the audio playing control is connected to an audio input port of a second audio control, and an audio output port of the second audio control is connected to an input port of the audio output control; and an audio stream of to-be-processed audio is controlled to flow from the audio input control sequentially through the audio playing control, the second audio control and the audio output control to obtain target special effect audio.

17 Claims, 3 Drawing Sheets

(58) Field of Classification Search
USPC .......................................................... 700/94
See application file for complete search history.

(56) References Cited

U.S. PATENT DOCUMENTS

| | | | |
|---|---|---|---|
| 10,643,592 B1 * | 5/2020 | Barbone | ................ G10H 1/14 |
| 2010/0169775 A1 | 7/2010 | Quandt et al. | |
| 2018/0286462 A1 | 10/2018 | Becherer et al. | |

FOREIGN PATENT DOCUMENTS

| | | |
|---|---|---|
| CN | 111899706 A | 11/2020 |
| CN | 113891151 A | 1/2022 |

OTHER PUBLICATIONS

Extended European Search Report for European Patent Application No. 23737128.1, mailed on Mar. 14, 2025, 10 pages.

* cited by examiner

METHOD AND APPARATUS FOR EDITING AUDIO SPECIAL EFFECT, DEVICE AND STORAGE MEDIUM

CROSS-REFERENCE TO RELATED APPLICATION

This application claims priority to Chinese Patent Application No. 202210020391.8, filed on Jan. 10, 2022, the disclosure of which is incorporated herein by reference in its entirety.

TECHNICAL FIELD

Embodiments of the present disclosure relate to the technical field of graphics editing and, in particular, to a method and apparatus for editing an audio special effect, a device and a storage medium.

BACKGROUND

Conventional audio editing software, which uses an audio track to edit audio, is very difficult to operate, complicated to configure, and difficult to be applied to scenes of editing special effects.

SUMMARY

Embodiments of the present disclosure provide a method and apparatus for editing an audio special effect, a device and a storage medium. Therefore, the editing of an audio special effect is achieved in a graphical manner, so that the complexity of editing an audio special effect can be reduced.

In a first aspect, the embodiments of the present disclosure provide a method for editing an audio special effect. The method includes steps described below.

A first audio control and a second audio control are created in an audio editing interface based on a first creation operation triggered by a user, where the first audio control includes an audio input control, an audio playing control and an audio output control, the second audio control includes at least one of an audio special effect control or an audio detection control, and the first audio control and the second audio control each include an audio input port and an audio output port.

An audio output port of the audio input control is connected to an audio input port of the audio playing control, an audio output port of the audio playing control is connected to the audio input port of the second audio control, and the audio output port of the second audio control is connected to an input port of the audio output control.

An audio stream of to-be-processed audio is controlled to flow from the audio input control sequentially through the audio playing control, the second audio control and the audio output control to obtain target special effect audio.

In a second aspect, the embodiments of the present disclosure further provide an apparatus for editing an audio special effect. The apparatus includes an audio control creation module, an audio control connection module and a target special effect audio acquisition module.

The audio control creation module is configured to create a first audio control and a second audio control in an audio editing interface based on a first creation operation triggered by a user, where the first audio control includes an audio input control, an audio playing control and an audio output control, the second audio control includes at least one of an audio special effect control or an audio detection control, and the first audio control and the second audio control each include an audio input port and an audio output port.

The audio control connection module is configured to connect an audio output port of the audio input control to an audio input port of the audio playing control, connect an audio output port of the audio playing control to the audio input port of the second audio control, and connect the audio output port of the second audio control to an input port of the audio output control.

The target special effect audio acquisition module is configured to control an audio stream of to-be-processed audio to flow from the audio input control sequentially through the audio playing control, the second audio control and the audio output control to obtain target special effect audio.

In a third aspect, the embodiments of the present disclosure further provide an electronic device. The electronic device includes one or more processing apparatuses and a storage apparatus configured to store one or more programs.

The one or more programs, when executed by the one or more processing apparatuses, cause the one or more processing apparatuses to implement the method for editing an audio special effect of the embodiments of the present disclosure.

In a fourth aspect, the embodiments of the present disclosure further provide a computer-readable medium storing a computer program which, when executed by a processing apparatus, implements the method for editing an audio special effect according to the embodiments of the present disclosure.

The embodiments of the present disclosure provide a method and apparatus for editing an audio special effect, a device and a storage medium. The first audio control and the second audio control are created in the audio editing interface based on the first creation operation triggered by the user, where the first audio control includes the audio input control, the audio playing control and the audio output control, the second audio control includes at least one of the audio special effect control or the audio detection control, and the first audio control and the second audio control each include the audio input port and the audio output port; the audio output port of the audio input control is connected to the audio input port of the audio playing control, the audio output port of the audio playing control is connected to the audio input port of the second audio control, and the audio output port of the second audio control is connected to the input port of the audio output control; and the audio stream of the to-be-processed audio is controlled to flow from the audio input control sequentially through the audio playing control, the second audio control and the audio output control to obtain the target special effect audio. According to the method for editing an audio special effect provided in the embodiments of the present disclosure, the editing of an audio special effect is achieved in a graphical manner, so that the complexity of editing an audio special effect can be reduced.

DETAILED DESCRIPTION

Figure 1:
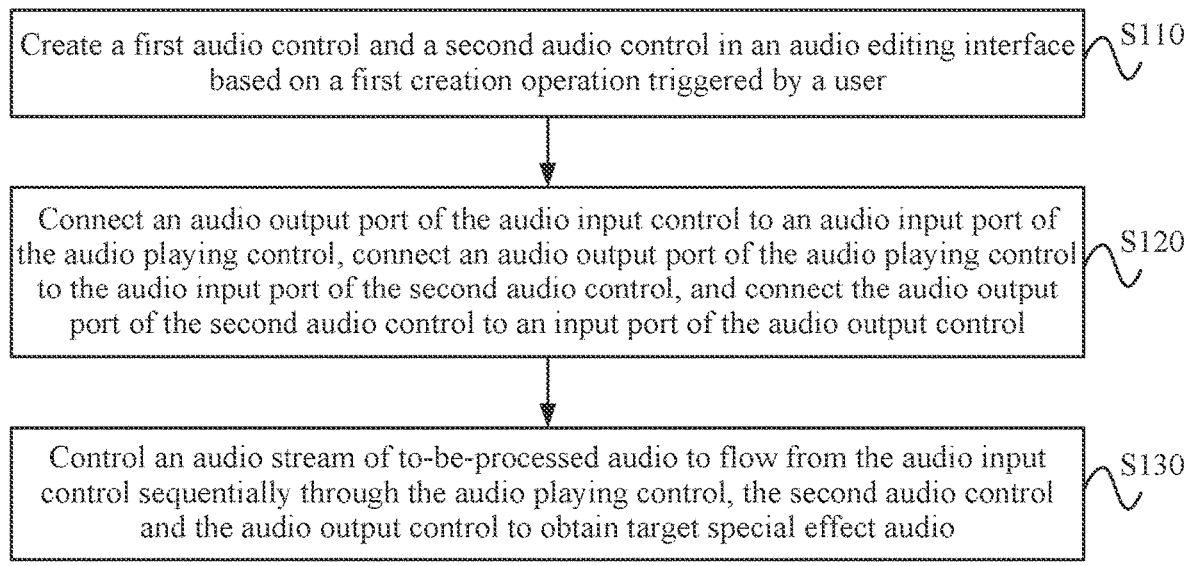
FIG. 1 is a flowchart of a method for editing an audio special effect according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and the embodiments of the present disclosure are merely illustrative and are not intended to limit the scope of the present disclosure.

It is to be understood that various steps recited in the method embodiments of the present disclosure may be performed in a different order, and/or in parallel. In addition, the method embodiments may include additional steps and/or omit execution of illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module or unit and are not intended to limit the order or interrelationship of the functions performed by the apparatus, module or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

FIG. 1 is a flowchart of a method for editing an audio special effect according to an embodiment of the present disclosure. This embodiment is applicable to the case of achieving the editing of an audio special effect in a graphical manner. The method may be executed by an apparatus for editing an audio special effect. The apparatus may be composed of hardware and/or software and generally be integrated in a device having a function of editing an audio special effect. The device may be an electronic device such as a server, a mobile terminal or a server cluster. As shown in FIG. 1, the method includes steps described below.

In S110, a first audio control and a second audio control are created in an audio editing interface based on a first creation operation triggered by a user.

The first audio control includes an audio input control, an audio playing control and an audio output control, the second audio control includes an audio special effect control and/or an audio detection control, and the first audio control and the second audio control each include an audio input port and an audio output port.

The audio input control may be understood as an audio signal source for inputting an audio signal, and the user may select an audio signal for inputting in the audio input control. The audio playing control may be understood as a control that controls audio playing. The audio output control is used for outputting an audio. The first audio control may further include an audio recording control, an audio gain control and an audio mixing control. The audio recording control may be used for recording an audio signal, the audio gain control is used for performing gain processing on an audio signal, and the audio mixing control is used for performing mixing processing on multiple audio signals.

The audio special effect control may be understood as a control for performing special effect processing on an audio signal. The audio special effect control may include a filtering control, a volume limit control, a volume adjustment control, a delay control, a reverberation control, a tremolo control and a volume amplification control, and the audio special effect control performs corresponding special effect processing on an input audio stream. The filtering control may be understood as a filter, and may include a high-pass filter or a disco filter. The volume limit control is used for limiting the volume of an audio signal. When the audio signal is mixed or the volume is increased, the volume may exceed 1.0, which may damage the audio quality. Therefore, the volume needs to be limited. The function of the volume limit control is to limit the volume of an audio signal to a set threshold value. The volume adjustment control is used for automatically adjusting the volume of an audio signal. When the volume is too high, the volume adjustment control turns down the volume, and when the volume is too low, the volume adjustment control turns up the volume. The delay control may be understood to perform delay processing on an audio signal, that is, generate an echo commonly referred to. The reverberation control may be used for creating a sense of distance and a sense of space for an audio signal. The tremolo control may be used for performing tremolo effect processing on an audio signal. The volume amplification control may be understood to amplify the volume of an audio signal to imitate the effect of a loudspeaker.

The audio detection control is used for detecting various parameters in an audio signal. The audio detection control may include an accent detection control, a volume detection control, a pitch detection control, a rhythm detection control and a frequency spectrum detection control, and the audio detection control detects audio information of an input audio stream of a current frame. The accent detection control is used for detecting the accent in an audio signal, and outputting the amplitude of the beat closest to a current audio frame. The volume detection control is used for detecting the volume of an audio signal, and outputting the volume of a current audio frame. The pitch detection control may be used for detecting the pitch of an audio signal and outputting the pitch of a current audio frame. The control supports only single-tone input; otherwise, the detection result would be confused. The rhythm detection control is used for detecting the rhythm intensity of the audio signal and outputting the rhythm intensity of a current audio frame. The rhythm intensity includes strong (1), weak (2), moderately strong (3) and moderately weak (4). The frequency spectrum detection control is used for detecting the frequency spectrum of an audio signal, and outputting the average value of the energy of the frequency spectrum segment corresponding to a current audio frame.

The audio input port and the audio output port are used for transmitting an audio stream. Specifically, the user adds the audio input control, the audio playing control and the audio output control to the audio editing interface, and then adds the audio special effect control and/or the audio detection control according to actual requirements for special effects.

In S120, an audio output port of the audio input control is connected to an audio input port of the audio playing control, an audio output port of the audio playing control is connected to the audio input port of the second audio control, and the audio output port of the second audio control is connected to an input port of the audio output control.

It is assumed that the second audio control is an audio special effect control, the audio output port of the audio input control is connected to the audio input port of the audio playing control, the audio output port of the audio playing control is connected to the audio input port of the audio special effect control, and the audio output port of the audio special effect control is connected to the input port of the audio output control. In the embodiment, the number and type of the created audio special effect controls are not limited.

It is assumed that the second audio control is an audio detection control, the audio output port of the audio input control is connected to the audio input port of the audio playing control, the audio output port of the audio playing control is connected to the audio input port of the audio detection control, and the audio output port of the audio detection control is connected to the input port of the audio output control. In the embodiment, the number and type of the created audio detection controls are not limited.

It is assumed that the second audio control includes an audio special effect control and an audio detection control, a connection order of the audio special effect control and the audio detection control needs to be determined, and the created first audio control and the created second audio control are connected according to the connection order.

In S130, an audio stream of to-be-processed audio is controlled to flow from the audio input control sequentially through the audio playing control, the second audio control and the audio output control to obtain target special effect audio.

In the embodiment, after the created first audio control and the created second audio control are connected, the audio stream of the to-be-processed audio flows from the audio input control sequentially through the audio playing control, the second audio control and the audio output control, and the audio output control outputs the target special effect audio.

Figure 2:
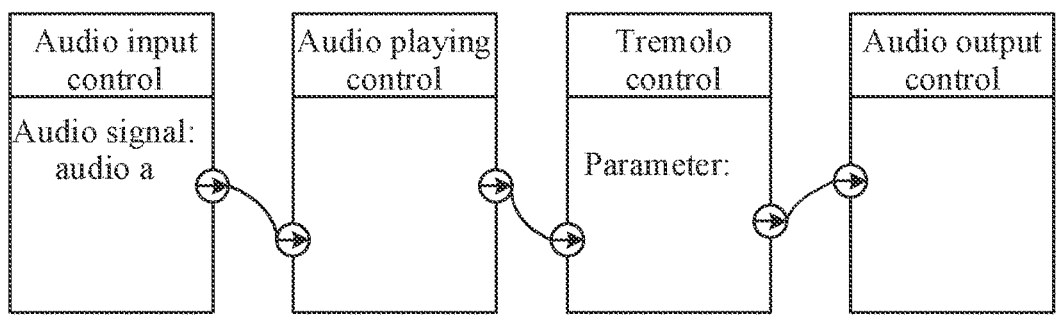
FIG. 2 is an example diagram of editing an audio special effect according to an embodiment of the present disclosure.

Exemplarily, FIG. 2 is an example diagram of editing an audio special effect according to an embodiment. As shown in FIG. 2, an audio input control, an audio playing control, a tremolo control and an audio output control are created in the audio editing interface. The audio output port of the audio input control is connected to the audio input port of the audio playing control, the audio output port of the audio playing control is connected to an audio input port of the tremolo control, and an audio output port of the tremolo control is connected to the input port of the audio output control. When audio a is selected in the audio input control, the audio stream of audio a flows from the audio input control sequentially through the audio playing control, the tremolo control and the audio output control, and audio obtained after tremolo processing is performed on audio a is finally output, so that the special effect processing of tremolo on audio a is achieved.

Optionally, the first audio control and the second audio control each include a control input port and a control output port, the control input port is used for receiving a trigger signal so that the first audio control or the second audio control triggers a corresponding function according to the trigger signal, and the control output port is used for outputting a trigger signal.

The trigger signal is used for triggering a function of the first audio control or a function of the second audio control. Exemplarily, it is assumed that the trigger signal is used for characterizing a time for the first audio control or the second audio control to perform a corresponding function; for example, the trigger signal may be a click on the screen or a set time interval.

Optionally, the step described below is further included. A signal generation control is created based on a second creation operation triggered by the user, and a control output port of the signal generation control is connected to the control input port of the first audio control and/or the control input port of the second audio control.

The signal generation control is used for generating a trigger signal, and inputting the generated trigger signal into the first audio control and/or the second audio control so as to trigger the first audio control and/or the second audio control to perform a corresponding function.

Figure 3:
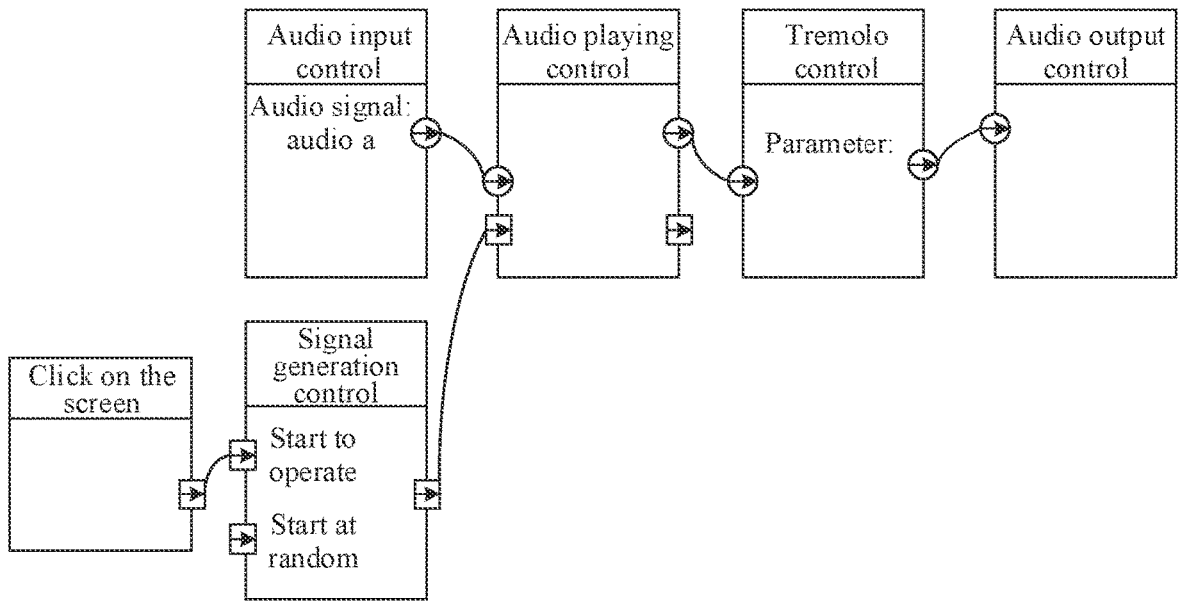
FIG. 3 is an example diagram of editing an audio special effect according to an embodiment of the present disclosure.

Exemplarily, FIG. 3 is an example diagram of editing an audio special effect according to an embodiment. As shown in FIG. 3, a control output port of the signal generation control is connected to the control input port of the audio playing control, and the signal generation control generates a trigger signal when detecting that the user clicks on the screen, and inputs the generated trigger signal into the audio playing control to trigger the playing of audio a.

Optionally, the second audio control may further include a data input port and a data output port. The audio special effect control performs a corresponding special effect function according to audio information received by the data input port; and the audio detection control outputs detected audio information through the data output port.

The audio information may be an accent amplitude, volume, pitch and a rhythm intensity (that is, a frequency spectrum) which are detected by the audio detection control, or may be a filtering frequency, a volume limit threshold, a volume adjustment value, a delay duration, a reverberation parameter, a tremolo parameter and a volume amplification parameter which are input into the audio special effect control.

For the audio special effect control, the audio information may be set by the user or input through the data input port. The audio information may be generated by the audio detection control or a built-in audio information generation control.

Optionally, the step described below is further included. An image special effect control is created based on a third creation operation triggered by the user, and the data output port of the audio detection control is connected to the image special effect control so that the image special effect control performs a corresponding special effect function according to the audio information.

Figure 4:
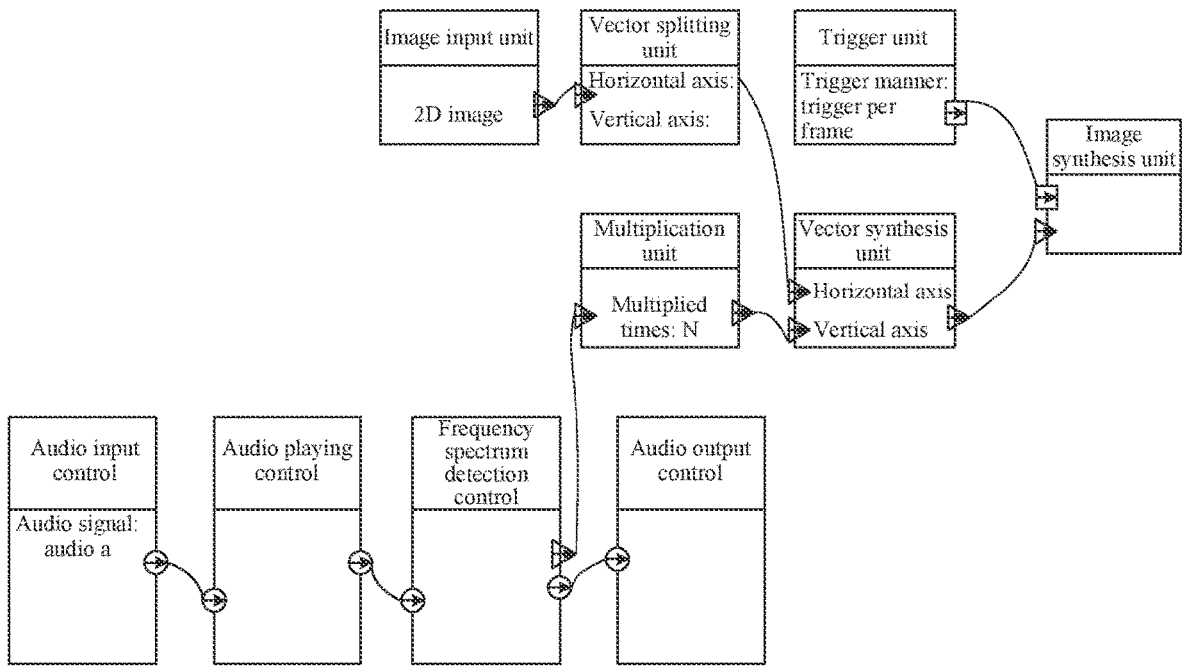
FIG. 4 is an example diagram of implementing an image special effect based on audio information according to an embodiment of the present disclosure.

The image special effect control is used for adding a special effect to an image. In the embodiment, the audio information output by the audio detection control may be used as a parameter in the special effect processing of the image special effect control. Exemplarily, FIG. 4 is an example diagram of implementing an image special effect based on audio information according to an embodiment. As shown in FIG. 4, the size of a sticker is adjusted by using the detected frequency spectrum. As shown in FIG. 4, the audio output port of the audio input control is connected to the audio input port of the audio playing control, the audio output port of the audio playing control is connected to an audio input port of the frequency spectrum detection control, an audio output port of the frequency spectrum detection control is connected to the input port of the audio output control, and a data output port of the frequency spectrum detection control is connected to the image special effect control, so as to input the detected frequency spectrum into the image special effect control. The image special effect control includes a multiplication unit, a vector synthesis unit, an image input unit, a vector splitting unit, a trigger unit and an image synthesis unit. As shown in FIG. 4, the data output port of the frequency spectrum detection control is connected to a data input port of the multiplication unit, a data output port of the multiplication unit is connected to a vertical axis input port of the vector synthesis unit, a data output port of the image input unit is connected to a data input port of the vector splitting unit, a data output port of the vector splitting unit is connected to a horizontal axis input port of the vector synthesis unit, a data output port of the vector synthesis unit is connected to a data input port of the image synthesis unit, and the trigger unit is connected to a control input port of the image synthesis unit. The multiplication unit is used for expanding the frequency spectrum by N times, the image input unit is used for inputting an image, the vector splitting unit is used for acquiring a horizontal axis length and a vertical axis length of the input image, the vector synthesis unit is used for performing vector synthesis on the input horizontal axis length and the input vertical axis length, the image synthesis unit is used for generating an image based on the input synthesized vector, and the trigger unit is used for generating a trigger signal to trigger the image synthesis unit to perform the function of image synthesis, so that the special effect of the vertical axis of the image changing with the detected frequency spectrum is achieved.

According to the technical solution of the embodiment, the first audio control and the second audio control are created in the audio editing interface based on the first creation operation triggered by the user, where the first audio control includes the audio input control, the audio playing control and the audio output control, the second audio control includes the audio special effect control and/or the audio detection control, and the first audio control and the second audio control each include the audio input port and the audio output port; the audio output port of the audio input control is connected to the audio input port of the audio playing control, the audio output port of the audio playing control is connected to the audio input port of the second audio control, and the audio output port of the second audio control is connected to the input port of the audio output control; and the audio stream of the to-be-processed audio is controlled to flow from the audio input control sequentially through the audio playing control, the second audio control and the audio output control to obtain the target special effect audio. According to the method for editing an audio special effect provided in the embodiment of the present disclosure, the editing of an audio special effect is achieved in a graphical manner, so that the complexity of editing an audio special effect can be reduced.

Figure 5:
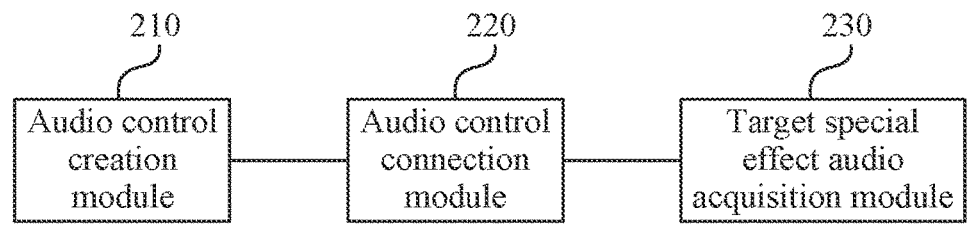
FIG. 5 is a structural diagram of an apparatus for editing an audio special effect according to an embodiment of the present application.

FIG. 5 is a structural diagram of an apparatus for editing an audio special effect according to an embodiment of the present application. As shown in FIG. 5, the apparatus includes an audio control creation module 210, an audio control connection module 220 and a target special effect audio acquisition module 230.

The audio control creation module 210 is configured to create a first audio control and a second audio control in an audio editing interface based on a first creation operation triggered by a user, where the first audio control includes an audio input control, an audio playing control and an audio output control, the second audio control includes an audio special effect control and/or an audio detection control, and the first audio control and the second audio control each include an audio input port and an audio output port.

The audio control connection module 220 is configured to connect an audio output port of the audio input control to an audio input port of the audio playing control, connect an audio output port of the audio playing control to the audio input port of the second audio control, and connect the audio output port of the second audio control to an input port of the audio output control.

The target special effect audio acquisition module 230 is configured to control an audio stream of to-be-processed audio to flow from the audio input control sequentially through the audio playing control, the second audio control and the audio output control to obtain target special effect audio.

Optionally, the audio special effect control includes a filtering control, a volume adjustment control, a volume limit control, a delay control, a reverberation control, a tremolo control and a volume amplification control, and the audio special effect control performs corresponding special effect processing on an input audio stream.

Optionally, the audio detection control includes an accent detection control, a volume detection control, a pitch detection control, a rhythm detection control and a frequency spectrum detection control, and the audio detection control detects audio information of an input audio stream of a current frame.

Optionally, the first audio control and the second audio control each include a control input port and a control output port, the control input port is used for receiving a trigger signal so that the first audio control or the second audio control triggers a corresponding function according to the trigger signal, and the control output port is used for outputting a trigger signal.

Optionally, the apparatus further includes a signal generation control creation module. The signal generation control creation module is configured to create a signal generation control based on a second creation operation triggered by the user, and connect a control output port of the signal generation control to the control input port of the first audio control and/or the control input port of the second audio control.

Optionally, the second audio control further includes a data input port and a data output port.

The audio special effect control performs a corresponding special effect function according to audio information received by the data input port.

The audio detection control outputs detected audio information through the data output port.

Optionally, the apparatus further includes an image special effect control creation module. The image special effect control creation module is configured to create an image special effect control based on a third creation operation triggered by the user, and connect the data output port of the audio detection control to the image special effect control so that the image special effect control performs a corresponding special effect function according to the audio information.

Figure 6:
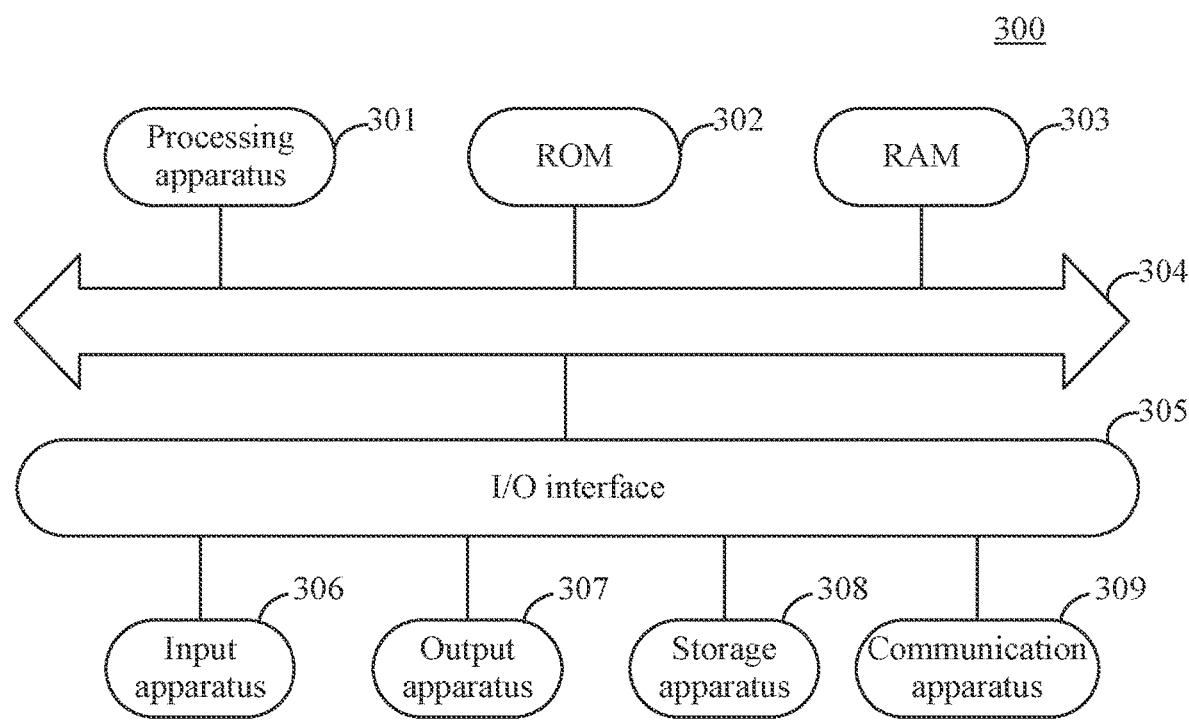
FIG. 6 is a structural diagram of an electronic device according to an embodiment of the present disclosure.

Referring to FIG. 6, FIG. 6 shows a structural diagram of an electronic device 300 suitable for implementing the embodiments of the present disclosure. The electronic device in the embodiment of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer, or various forms of servers such as an independent server or a server cluster. The electronic device shown in FIG. 6 is merely an example and is not intended to limit the function and usage scope of the embodiments of the present disclosure.

As shown in FIG. 6, the electronic device 300 may include a processing apparatus 301 (such as a central processing unit and a graphics processing unit). The processing apparatus 301 may execute various types of appropriate operations and processing based on a program stored in a read-only memory (ROM) 302 or a program loaded from a storage apparatus 308 to a random-access memory (RAM) 303. Various programs and data required for the operation of the electronic device 300 are also stored in the RAM 303. The processing apparatus 301, the ROM 302 and the RAM 303 are connected to each other through a bus 304. An input/output (I/O) interface 305 is also connected to the bus 304.

Generally, the following apparatuses may be connected to the I/O interface 305: an input apparatus 306 such as a touch screen, a touch pad, a keyboard, a mouse, a camera, a microphone, an accelerometer, and a gyroscope; an output apparatus 307 such as a liquid crystal display (LCD), a speaker, and a vibrator; the storage apparatus 308 such as a magnetic tape and a hard disk; and a communication apparatus 309. The communication apparatus 309 may allow the electronic device 300 to perform wireless or wired communication with other devices so as to exchange data. Although FIG. 6 illustrates the electronic device 300 having various apparatuses, it is to be understood that not all of the apparatuses illustrated herein need to be implemented or present. Alternatively, more or fewer apparatuses may be implemented or present.

Particularly, according to the embodiments of the present disclosure, the process described above with reference to a flowchart may be implemented as a computer software program. For example, the embodiments of the present disclosure include a computer program product. The computer program product includes a computer program carried in a computer-readable medium. The computer program includes program codes for performing the above method for editing an audio special effect. In such an embodiment, the computer program may be downloaded from a network and installed through the communication apparatus 309, or may be installed from the storage apparatus 308, or may be installed from the ROM 302. When the computer program is executed by the processing apparatus 301, the preceding functions defined in the method of the embodiments of the present disclosure are executed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by an instruction execution system, apparatus or device or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms, including, but not limited to, an electromagnetic signal, an optical signal, or any suitable combination thereof. The computer-readable signal medium may also be any computer-readable medium except the computer-readable storage medium. The computer-readable signal medium may send, propagate or transmit a program used by an instruction execution system, apparatus or device or used in conjunction with an instruction execution system, apparatus or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any network currently known or to be developed in the future.

The preceding computer-readable medium may be included in the preceding electronic device or may exist alone without being assembled into the electronic device.

The preceding computer-readable medium carries one or more programs which, when executed by the electronic device, cause the electronic device to: create a first audio control and a second audio control in an audio editing interface based on a first creation operation triggered by a user, where the first audio control includes an audio input control, an audio playing control and an audio output control, the second audio control includes an audio special effect control and/or an audio detection control, and the first audio control and the second audio control each include an audio input port and an audio output port; connect an audio output port of the audio input control to an audio input port of the audio playing control, connect an audio output port of the audio playing control to the audio input port of the second audio control, and connect the audio output port of the second audio control to an input port of the audio output control; and control an audio stream of to-be-processed audio to flow from the audio input control sequentially through the audio playing control, the second audio control and the audio output control to obtain target special effect audio.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN), or may be connected to an external computer (for example, via the Internet through an Internet service provider).

Flowcharts and block diagrams among the drawings illustrate architectures, functions, and operations possible to implement in accordance with the system, method, and computer program product in various embodiments of the present disclosure. In this regard, each block in the flowcharts or block diagrams may represent a module, a program segment, or part of codes that contains one or more executable instructions for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The involved units described in the embodiments of the present disclosure may be implemented by software or hardware. The name of a unit is not intended to limit the unit in a certain circumstance.

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program used by an instruction execution system, apparatus or device or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to one or more embodiments of the present disclosure, a method for editing an audio special effect is disclosed and includes steps described below.

A first audio control and a second audio control are created in an audio editing interface based on a first creation operation triggered by a user, where the first audio control includes an audio input control, an audio playing control and an audio output control, the second audio control includes an audio special effect control and/or an audio detection control, and the first audio control and the second audio control each include an audio input port and an audio output port.

An audio output port of the audio input control is connected to an audio input port of the audio playing control, an audio output port of the audio playing control is connected to the audio input port of the second audio control, and the audio output port of the second audio control is connected to an input port of the audio output control.

An audio stream of to-be-processed audio is controlled to flow from the audio input control sequentially through the audio playing control, the second audio control and the audio output control to obtain target special effect audio.

Further, the audio special effect control includes a filtering control, a volume adjustment control, a volume limit control, a delay control, a reverberation control, a tremolo control and a volume amplification control, and the audio special effect control performs corresponding special effect processing on an input audio stream.

Further, the audio detection control includes an accent detection control, a volume detection control, a pitch detection control, a rhythm detection control and a frequency spectrum detection control, and the audio detection control detects audio information of an input audio stream of a current frame.

Further, the first audio control and the second audio control each include a control input port and a control output port, the control input port is used for receiving a trigger signal so that the first audio control or the second audio control triggers a corresponding function according to the trigger signal, and the control output port is used for outputting a trigger signal.

Further, the step described below is further included. A signal generation control is created based on a second creation operation triggered by the user, and a control output port of the signal generation control is connected to the control input port of the first audio control and/or the control input port of the second audio control.

Further, the second audio control further includes a data input port and a data output port.

The audio special effect control performs a corresponding special effect function according to audio information received by the data input port.

The audio detection control outputs detected audio information through the data output port.

Further, the step described below is further included. An image special effect control is created based on a third creation operation triggered by the user, and the data output port of the audio detection control is connected to the image special effect control so that the image special effect control performs a corresponding special effect function according to the audio information.

The preceding apparatus may execute the method provided in all of the preceding embodiments of the present disclosure and has function modules for and beneficial effects of executing the preceding method. For technical details that are not described in detail in the embodiment, reference may be made to the method provided in all of the preceding embodiments of the present disclosure.

It is to be noted that the above are preferred embodiments of the present disclosure and the technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A method for editing an audio special effect, comprising:
    creating a first audio control and a second audio control in an audio editing interface based on a first creation operation triggered by a user, wherein the first audio control comprises an audio input control, an audio playing control and an audio output control, the second audio control comprises an audio special effect control and an audio detection control, and the first audio control and the second audio control each comprise an audio input port and an audio output port, wherein the audio playing control is a control that controls audio playing;
    connecting an audio output port of the audio input control to an audio input port of the audio playing control, connecting an audio output port of the audio playing control to the audio input port of the second audio control, and connecting the audio output port of the second audio control to an input port of the audio output control; and
    controlling an audio stream of to-be-processed audio to flow from the audio input control sequentially through the audio playing control, the second audio control and the audio output control to obtain target special effect audio.

2. The method according to claim 1, wherein the audio special effect control comprises a filtering control, a volume adjustment control, a volume limit control, a delay control, a reverberation control, a tremolo control and a volume amplification control, and the audio special effect control is configured to perform corresponding special effect processing on an input audio stream.

3. The method according to claim 1, wherein the audio detection control comprises an accent detection control, a volume detection control, a pitch detection control, a rhythm detection control and a frequency spectrum detection control, and the audio detection control is configured to detect audio information of an input audio stream of a current frame.

4. The method according to claim 2, wherein the first audio control and the second audio control each comprise a control input port and a control output port, the control input port is used for receiving a trigger signal so that the first audio control or the second audio control triggers a corresponding function according to the trigger signal, and the control output port is used for outputting the trigger signal.

5. The method according to claim 3, wherein the first audio control and the second audio control each comprise a control input port and a control output port, the control input port is used for receiving a trigger signal so that the first audio control or the second audio control triggers a corresponding function according to the trigger signal, and the control output port is used for outputting the trigger signal.

6. The method according to claim 4, further comprising: creating a signal generation control based on a second creation operation triggered by the user, and connecting a control output port of the signal generation control to at least one of the control input port of the first audio control or the control input port of the second audio control.

7. The method according to claim 3, wherein the second audio control further comprises a data input port and a data output port, and the method further comprises:
    performing, by the audio special effect control, a corresponding special effect function according to audio information received by the data input port;
    outputting, by the audio detection control, detected audio information through the data output port.

8. The method according to claim 7, further comprising: creating an image special effect control based on a third creation operation triggered by the user, and connecting a data output port of the audio detection control to the image special effect control so that the image special effect control performs a corresponding special effect function according to the detected audio information.

9. An electronic device, comprising:
    at least one processing apparatus; and
    a storage apparatus configured to store at least one program;
    wherein the at least one program, when executed by the at least one processing apparatus, causes the at least one processing apparatus to implement following steps:
    creating a first audio control and a second audio control in an audio editing interface based on a first creation operation triggered by a user, wherein the first audio control comprises an audio input control, an audio playing control and an audio output control, the second audio control comprises an audio special effect control and an audio detection control, and the first audio control and the second audio control each comprise an audio input port and an audio output port, wherein the audio playing control is a control that controls audio playing;
    connecting an audio output port of the audio input control to an audio input port of the audio playing control, connecting an audio output port of the audio playing control to the audio input port of the second audio control, and connecting the audio output port of the second audio control to an input port of the audio output control; and
    controlling an audio stream of to-be-processed audio to flow from the audio input control sequentially through the audio playing control, the second audio control and the audio output control to obtain target special effect audio.

10. The electronic device according to claim 9, wherein the audio special effect control comprises a filtering control, a volume adjustment control, a volume limit control, a delay control, a reverberation control, a tremolo control and a volume amplification control, and the audio special effect control is configured to perform corresponding special effect processing on an input audio stream.

11. The electronic device according to claim 9, wherein the audio detection control comprises an accent detection control, a volume detection control, a pitch detection control, a rhythm detection control and a frequency spectrum detection control, and the audio detection control is configured to detect audio information of an input audio stream of a current frame.

12. The electronic device according to claim 10, wherein the first audio control and the second audio control each comprise a control input port and a control output port, the control input port is used for receiving a trigger signal so that the first audio control or the second audio control triggers a corresponding function according to the trigger signal, and the control output port is used for outputting the trigger signal.

13. The electronic device according to claim 11, wherein the first audio control and the second audio control each comprise a control input port and a control output port, the control input port is used for receiving a trigger signal so that the first audio control or the second audio control triggers a corresponding function according to the trigger signal, and the control output port is used for outputting the trigger signal.

14. The electronic device according to claim 12, wherein the at least one program, when executed by the at least one processing apparatus, further causes the at least one processing apparatus to implement following steps: creating a signal generation control based on a second creation operation triggered by the user, and connecting a control output port of the signal generation control to at least one of the control input port of the first audio control or the control input port of the second audio control.

15. The electronic device according to claim 11, wherein the second audio control further comprises a data input port and a data output port, and the at least one program, when executed by the at least one processing apparatus, further causes the at least one processing apparatus to implement following steps:

performing, by the audio special effect control, a corresponding special effect function according to audio information received by the data input port;

outputting, by the audio detection control, detected audio information through the data output port.

16. The electronic device according to claim 15, the at least one program, when executed by the at least one processing apparatus, further causes the at least one processing apparatus to implement following steps: creating an image special effect control based on a third creation operation triggered by the user, and connecting a data output port of the audio detection control to the image special effect control so that the image special effect control performs a corresponding special effect function according to the detected audio information.

17. A non-transitory computer-readable medium storing a computer program which, when executed by a processing apparatus, implements the following steps:

creating a first audio control and a second audio control in an audio editing interface based on a first creation operation triggered by a user, wherein the first audio control comprises an audio input control, an audio playing control and an audio output control, the second audio control comprises an audio special effect control and an audio detection control, and the first audio control and the second audio control each comprise an audio input port and an audio output port, wherein the audio playing control is a control that controls audio playing;

connecting an audio output port of the audio input control to an audio input port of the audio playing control, connecting an audio output port of the audio playing control to the audio input port of the second audio control, and connecting the audio output port of the second audio control to an input port of the audio output control; and controlling an audio stream of to-be-processed audio to flow from the audio input control sequentially through the audio playing control, the second audio control and the audio output control to obtain target special effect audio.

\* \* \* \* \*